2 Sheets--Sheet 1.

J. A. PIPO.

Machine for Making Ruffles.

No. 6,565. Reissued July 27, 1875.

*Witnesses:*
N. L. Barnum
Ph. Blohm

*Inventor:*
John A. Pipo

2 Sheets--Sheet 2.

J. A. PIPO.

Machine for Making Ruffles.

No. 6,565. Reissued July 27, 1875.

*Witnesses:*

A. K. Barnum

Ph. Blohm

*Inventor:*

John A. Pipo

UNITED STATES PATENT OFFICE.

JOHN A. PIPO, OF NEW YORK, N. Y., ASSIGNOR, BY MESNE ASSIGNMENTS, TO GEORGE H. WOOSTER.

IMPROVEMENT IN MACHINES FOR MAKING RUFFLES.

Specification forming part of Letters Patent No. 37,550, dated January 27, 1863; Reissue No. 6,565, dated July 27, 1875.

*To all whom it may concern:*

Be it known that I, JOHN A. PIPO, of the city, county, and State of New York, have invented certain Improvements in Ruffling or Plaiting Mechanisms, of which the following is a specification.

This invention relates to a mechanism for forming ruffles or plaiting fabrics; and it consists in the combination in a ruffling mechanism of a flexible ruffling-blade, and with such blade is combined a guide adapted to guide the material to which the ruffle is to be attached, and also other parts or devices, substantially as hereinafter described, to form a ruffle to be connected by a series of stitches.

Figure 1:
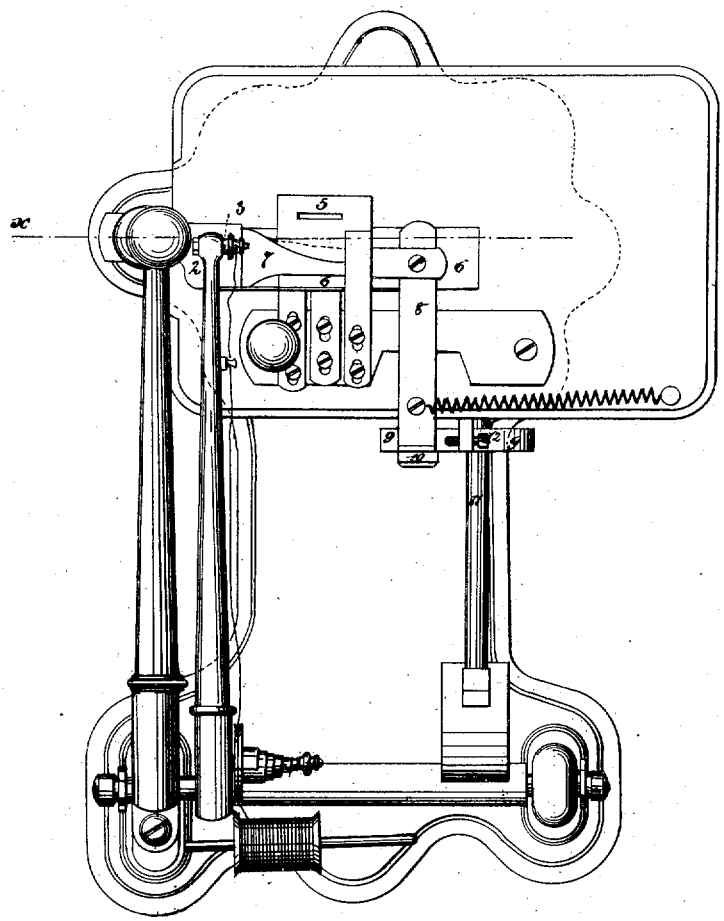
Figure 2:
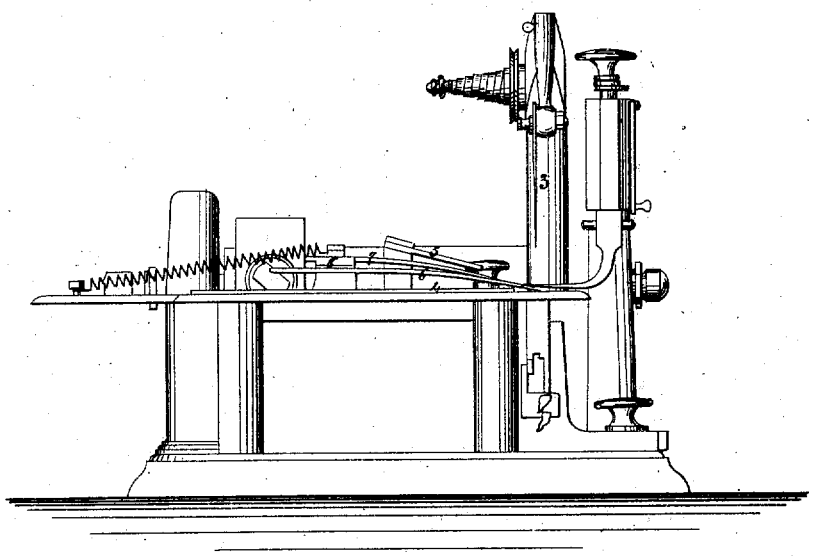
Figure 3:
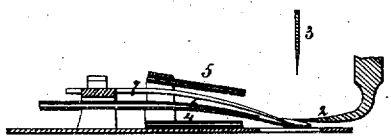

Figure 1 is a plan view, representing an ordinary Wheeler & Wilson sewing-machine with my improvement attached. Fig. 2 is an end view of the same, showing the end toward the observer which is at the right hand in Fig. 1. Fig. 3 is a detail vertical transverse section, showing more fully certain parts at the left hand of the line *x x*, as drawn partially across Fig. 1.

1 is the bed-plate, upon which in an ordinary sewing-machine the work is usually laid to be sewed.

2 is the presser, by which the work is kept down to its place.

3 is the needle.

4 is a lower and 5 is an upper guide, through which strips of cloth between which the ruffling is to be sewed are passed. These guides are made tubular, as represented in Fig. 3, the internal width of the tube or opening at the outer end being sufficiently wide to admit a strip of cloth of the proper width. The end next the needle of each of these pieces or guides is so formed as to turn in the edge of the cloth to form a hem, said edge being turned in each case toward the other guide, so that the fold or hem shall come next the ruffling.

6 is a tube, which guides the strip of cloth of which the ruffling is formed. This tube is flat, like the others, and with a proper internal width to receive and guide the cloth intended to be used. It is open on the top, near the end toward the needle, to receive blade 7, by which the ruffling is formed, so as to allow said blade to work directly upon the cloth. This blade is a spring or is made flexible, and is provided at the end next the needle with points or a roughened surface or sharp edge, which will take hold of the cloth to be ruffled and move it forward upon the smooth surface to which it is opposed, and its acting-edge is preferably turned or bent toward the surface against which it acts to form the material between it and the surface into a ruffle. The blade is adjustably attached to bar 8, actuated by the rocking or elbow lever 9, hung to a support or pendant connected with the bed-plate of the machine. This lever 9 is vibrated on its axis 10 by means of the vibrating member or rod 11, connected with and operating the needle and its carrier, which rises against the horizontal portion of the lever and causes it to move the blade forward and form the cloth on which it bears into a ruffle. The movement of the blade back from the needle is regulated by means of a set-screw, 12, which restricts the return of the lever and blade. The bar 8, and consequently the lever 9, is drawn back from each forward vibration by a spiral spring, 13, which is attached at one end to this bar and at the other end to the bed of the machine, and the end of the blade may be made to terminate at a greater or less distance from its carrying-bar by means of a slot and set-screw. The operation of the lever is to press the spring-blade on the goods when advancing to form the ruffling, while it is rocked or lifted from the goods during its retreating movement, and the pressure of the blade on the material is thereby diminished or removed.

Operation: The strip of cloth to be ruffled is passed under the blade and between it and the presser, and the plain or band material is led through guide 5, when the plain piece is to rest on top of the ruffled strip and under the presser, where, as the material is ruffled and sewed, it is carried forward by the feeding mechanism such as is usually employed for that purpose and in the ordinary manner. The edge or edges of the cloth, to or between which the ruffling is to be sewed, is or are folded in by the guides, as before stated, and the strips used are fed or moved forward in the same manner that other fabrics are moved on the same machine. The ruffle is formed by blade 7, which is made to reciprocate at each stroke of the needle a sufficient distance over and above the support or surface adapted to sustain the material to be ruffled against the action of the blade to form a ruffle, having folds or plaits of the size desired, the size of the fold to form various grades of ruffling being determined by the means already described.

It is obvious that guides of different widths may be employed to admit strips of cloth of different widths, to or between which the ruffled material is to be sewed.

It will be noticed that the presser or holder 2, which bears on the ruffled material to flatten and smooth it, extends laterally from the needle hole or opening in the presser or holder, and the end of the ruffling-blade is wide enough to extend laterally from the needle-hole in the foot for a like distance, and the material being ruffled is held down from its line of stitching to its edge by a solid or unyielding presser or holder, but the presser or holder and blade being preferably adapted in width to the width of the ruffled material to press it for its whole width.

I am aware that a rough-surfaced feeder and ruffler have been employed to engage a piece of material to be ruffled, forming the gather in and moving the ruffled piece forward, the ruffler and feeder both engaging the ruffled strip, and in connection with such mechanism a separator has been employed to separate a band from the ruffled strip, the band being laid on the surface of the ruffled strip engaged on its under side by the ruffler and feeder made as four-motioned feeding devices, and I am also aware of United States Patent No. 14,475.

What I claim, and desire to secure by Letters Patent, is—

1. In a ruffling mechanism, a spring or flexible blade having its acting edge turned or bent toward the surface against which it acts to form the ruffle, in combination with a carrier to which the blade is rigidly attached, substantially as described.

2. A ruffling-blade arranged above the cloth-plate and combined with an actuating lever adapted to carry and press the blade on the goods in advancing and to relieve the pressure of the blade from the surface of the goods while retreating, substantially as described.

3. A blade adapted to form but not to space a fold or plait in a strip to be ruffled, in combination with a feed to engage and move the material after the ruffle is formed, substantially as described.

4. The combination, with a flexible ruffling-blade, of an actuating-lever or rocking shaft, to which the said blade is rigidly affixed, substantially as described.

5. The combination, with a ruffling-blade and a support for the material to be ruffled, of a guide adapted to present a band for the ruffled material to the action of sewing mechanism, substantially as described.

6. The combination, with a ruffling-blade and a support for material to be ruffled, of a guide adapted to turn the edge of a band and present it to the action of sewing mechanism, substantially as described.

7. The combination, with the actuating-lever and ruffling-blade, of a regulating device to regulate the extent of backward movement of the blade without affecting the position to which the forward end of the blade moves, for the purpose set forth.

8. In a ruffling or plaiting mechanism, a spring or flexible blade rigidly affixed to its carrier, in combination with a surface opposed to the blade and adapted to sustain the material being ruffled against the action of the blade, substantially as described.

9. In a ruffling or plaiting mechanism, a pressing or holding mechanism having a solid or unyielding surface arranged and adapted to cover and press the whole width of the plaited fabric, substantially as described.

10. In a ruffling mechanism, the combination, with a blade and rocking lever, of a vibrating member of the needle-actuating mechanism adapted to rock the lever and move the blade to form a ruffle, substantially as described.

11. In a ruffling mechanism, a support for an elbow-lever, in combination with an elbow-lever pivoted at its angle to the support and adapted at one end to operate a ruffling-blade rigidly affixed thereto and to have motion imparted to it at its other end, substantially as described.

12. The combination of the ruffling-blade and its carrier with adjusting mechanism to determine the position of the forward or working edge of the ruffling-blade with relation to its carrier, substantially as described.

13. The combination of a rocking or elbow lever and an adjustable ruffling-blade operated by the lever with mechanism, substantially as described, for adjusting the throw of the lever.

JOHN A. PIPO.

Witnesses:
N. K. BARNUM,
PH. BLOHM.